United States Patent
Alibakhsh et al.

(10) Patent No.: US 10,158,618 B2
(45) Date of Patent: Dec. 18, 2018

(54) SYSTEM AND METHOD FOR SECURELY ACCESSING DATA THROUGH WEB APPLICATIONS

(71) Applicants: Massoud Alibakhsh, Atlanta, GA (US); Shahram Famorzadeh, Marietta, GA (US)

(72) Inventors: Massoud Alibakhsh, Atlanta, GA (US); Shahram Famorzadeh, Marietta, GA (US)

(73) Assignee: NUESOFT TECHNOLOGIES, INC., Marietta, GA (US)

( * ) Notice: Subject to any disclaimer, the term of this patent is extended or adjusted under 35 U.S.C. 154(b) by 0 days.

(21) Appl. No.: 13/786,723

(22) Filed: Mar. 6, 2013

(65) Prior Publication Data

US 2014/0259105 A1 Sep. 11, 2014

(51) Int. Cl.
H04L 29/06 (2006.01)

(52) U.S. Cl.
CPC .............. *H04L 63/08* (2013.01); *H04L 63/14* (2013.01)

(58) Field of Classification Search
CPC ....... H04L 63/08; H04L 63/10; H04L 63/101; H04L 63/105; H04L 67/02; G06F 17/30545; G06F 21/6218; G06F 21/62
USPC .................................................. 726/3, 4, 5
See application file for complete search history.

(56) References Cited

U.S. PATENT DOCUMENTS

| | | | |
|---|---|---|---|
| 6,804,333 B1 * | 10/2004 | Liu | H04M 3/4938 379/88.17 |
| 7,188,112 B1 * | 3/2007 | Lindquist | G06F 17/3089 707/827 |
| 7,904,111 B2 | 3/2011 | Kilin-Kehr | |
| 8,429,162 B1 * | 4/2013 | Wang et al. | 707/737 |
| 2004/0054933 A1 * | 3/2004 | Wong et al. | 713/202 |
| 2006/0168259 A1 * | 7/2006 | Spilotro | H04L 63/102 709/229 |
| 2008/0059798 A1 | 3/2008 | Fedronic | |

(Continued)

OTHER PUBLICATIONS

Dabirsiaghi, Arshan, Bypassing Web Authentication and Authorization with HTTP Verb Tampering: How to inadvertently allow attackers full access to your web application, White Paper: Aspect Security, May 2008.

(Continued)

*Primary Examiner* — Saleh Najjar
*Assistant Examiner* — Louis C Teng
(74) *Attorney, Agent, or Firm* — Mathew L. Grell; Jeffrey Watson; Grell & Watson Patent Attorneys LLC

(57) ABSTRACT

A system for providing information server security in a distributed computing environment achieved by injecting a proprietary mediating entity into the solicitation of service request process via web server between application servers and information servers. The system comprises a computer apparatus, a mediating entity, solicitation for service requests and responses to the solicitations for service requests. The mediating entity is comprised of an application server hosting a proprietary mediating entity client and a mediating entity server, where the proprietary mediating entity client comprises industry-recognized business organization selected security protocols. The information server comprises a database server and a database, the database comprises data that is extracted or stored based on the service request.

11 Claims, 11 Drawing Sheets

(56) References Cited

U.S. PATENT DOCUMENTS

| | | | |
|---|---|---|---|
| 2010/0030881 A1 | 2/2010 | Sa de Souza | |
| 2010/0131650 A1* | 5/2010 | Pok | H04L 41/0896 |
| | | | 709/226 |
| 2010/0180029 A1* | 7/2010 | Fourman | G06F 17/30867 |
| | | | 709/225 |
| 2010/0205643 A1* | 8/2010 | Raftelis | H04N 7/17318 |
| | | | 725/110 |
| 2010/0205657 A1* | 8/2010 | Manring et al. | 726/5 |
| 2012/0166483 A1* | 6/2012 | Choudhary et al. | 707/770 |
| 2012/0297189 A1* | 11/2012 | Hayton | H04L 9/0822 |
| | | | 713/165 |
| 2013/0097715 A1* | 4/2013 | Fourman | G06F 17/30867 |
| | | | 726/26 |
| 2013/0254254 A1* | 9/2013 | Livshits | G06Q 10/10 |
| | | | 709/201 |
| 2014/0123228 A1* | 5/2014 | Brill | H04L 63/1416 |
| | | | 726/4 |
| 2014/0208394 A1* | 7/2014 | Goodwin | H04L 63/102 |
| | | | 726/4 |
| 2014/0281918 A1* | 9/2014 | Wei | H04L 67/02 |
| | | | 715/234 |
| 2014/0351204 A1* | 11/2014 | Kunnatur | G06F 17/30486 |
| | | | 707/609 |
| 2014/0372702 A1* | 12/2014 | Subramanyam | G06F 12/0848 |
| | | | 711/129 |

OTHER PUBLICATIONS

Humenn, Polar, Older, Susan, Chin, Shiu-Kai, Formal Analysis of the Corba CSIv2 Security Protocol, White Paper: Systems Assurance Institute, Syracuse University, Syracuse, New York, Apr. 2003.

\* cited by examiner

SYSTEM AND METHOD FOR SECURELY ACCESSING DATA THROUGH WEB APPLICATIONS

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

Technical Field of the Invention

The present invention relates generally to information server security and secure network architecture. Specifically, it provides a system and method of securely accessing databases through web applications.

Description of Related Art

Generally speaking, mobile web applications rely on web services to connect to information servers. Current web services (e.g., Internet Application Server, Apache, and Tomcat) provide inadequate protection against constantly evolving malicious attacks, therefore leaving web applications and their data vulnerable. As a result, businesses are forced to trade security for mobile functionality when developing browser-based applications.

The most prominent security vulnerability stems from the wide spread use of a few open source and proprietary web service solutions. Information concerning the inner workings and security protocols of these services are widely available on forums, blogs, and release notes. Therefore, malicious users can easily circumvent security measures with a little Internet research. As a result, the cost of development is exceedingly high since developers must constantly create new security patches.

Proponents of open source software claim that public disclosure provides immense scrutiny of security vulnerabilities, thereby increasing security. However, there is significant time between implementing security patches after identifying system vulnerabilities. Malicious attackers have an abundance of time to exploit publicly disclosed security vulnerabilities.

Even stringent security measures like Secure Shell Protocol (SSH) are vulnerable while in wide-spread use. By analyzing public documentation, SSH vulnerabilities such as Plain Text Attacks are obvious to those skilled in the art. Plain Text attacks enable a user to intercept and retrieve encrypted data traveling via secure Internet Protocols (IPs) by sending cipher text blocks as the initial blocks in the protocol's packet. This results in the SSH server interpreting the cipher text as a legitimate SSH packet block of data. Users can periodically send blocks until the SSH server concludes the message has been sent and utilize this information to disable the server, which causes the message's content to be revealed. Thus, when implemented in open software vulnerabilities are common. In fact, even after the bug is discovered, the exploit remains during patch development.

One attempt to shield information servers from attack through web services involves replacing legitimate data object source files with fake ones once a server is infiltrated. If attackers attempt to use the address and credentials in the fake data object source file, they will be redirected to a security control server that alerts the system administrator. Although this method attempts to hide the legitimate data object source file, intruders can still access it.

Another security protocol provides interoperability among client requests and corresponding servers without compromising transport layer security. Communication between distinct objects is secured by providing requestors with a trusted pseudo identity. This enables servers to securely communicate with requestors via an authorized. Unfortunately, the protocol is compromised as detailed information concerning its architecture, functionality, and configuration options is readily available through the Internet.

Yet another method of securing web services involves authenticating requests from application servers with usernames and passwords. After initial authentication, application servers forward only usernames to the Security Service server (SS). The SS server then performs secondary authentication by matching given usernames with passwords. Security would be compromised if an attacker were to gain access to credential repositories. This access would be possible because the credentials and IP addresses to their location are often available in lower security areas.

A further method authorizes access to application servers by comparing request attributes and security privileges to rules stored in the information server. Despite security privileges, information servers remain vulnerable to direct attacks by circumventing authentication and the application server as described above. Moreover, request attributes passed to information servers for authentication could be an avenue for SQL injection.

Current web-service security measures do not provide adequate protection against today's sophisticated malicious attacks. Architectural information and security flaws for most web and application servers are widely published. Unfortunately, these systems are necessary for interoperability. Therefore, it is readily apparent that there is a need for a system and method of providing information server security by injecting a proprietary mediating entity between the application server and the information server.

BRIEF SUMMARY OF THE INVENTION

Briefly described, in a preferred embodiment, the present invention overcomes the above-mentioned disadvantages and meets the recognized need for such a device by providing a system and method of providing information server security by injecting a proprietary mediating entity between the application server and the information server.

Increased security in web service transactions is achieved by injecting a mediating entity between the application and information server, which enforces proprietary security protocols. Requests to the information server are mediated by the mediating entity. Thus, the vulnerabilities of web servers and application servers are separated from information servers.

Standard web service protocols allow direct communication between application and information servers. If the web server and/or application server are compromised in a standard web services model then the information server is left defenseless.

The present invention intercepts service requests from application servers and forwards them to the mediating entity server(s), thereby protecting information servers from direct attacks. As a result of this mediation, application and information servers can communicate securely. The mediating entity, containing proprietary protocols, would force an attacker to learn the system's workings before attempting information server attacks.

In the preferred embodiment, the mediating entity comprises a proprietary client and server security system. The mediating entity client exists on its own machine or alternatively is stored on the application server and communicates with the mediating entity server; both the client and server are placed between the application server and the information server. For optimum security, only privileged administrators know the mediating entity's security protocols. Without direct access to the mediating entity or information servers' security protocols an attempt to breach by one of the aforementioned methods yields significantly less or even no access to the contents of the information server.

In one example, web applications initiate data requests from information servers. Requests travel through the web server where they are verified by security protocols. Next, requests proceed to the application server for processing which creates subsequent requests based on the initial request to the mediating entity. Finally, the mediating entity authenticates the request by querying the information server for the requested information.

One benefit of the present invention is secure mobile transactions. Disseminating confidential information is increasingly employed by mobile web applications, an example of which is a mobile bank application that transmits account numbers, transactions, and other sensitive data through web services.

Another benefit of the present invention is proprietary security protocols protecting the information server. An extra security layer that requires authentication between the application and information servers keeps data safe even if the web server and application server are compromised. This improves upon previous systems by preventing attackers from accessing information servers through well-known web services security flaws.

For example, an attacker compromises web servers and/or application servers through well-known security protocols. In a standard system, attackers have free reign to submit various queries in order to discern the information server structure and the location of valuable data. In the present invention, the mediating entity would reject all requests sent by Powerful Adversaries (i.e., Hackers) as they are not authenticated. Because of the multi-layered security protection, the only way to gain access to the information server would be to learn requestor credentials that would satisfy the proprietary security protocols in place (e.g. user name and password for secure program and database).

Even if attackers were to steal legitimate credentials, they would only have limited access to data. Unlike the vulnerabilities current security systems present, attackers would not have free reign to view, alter, or delete all data contained in the information server. Infiltration of the mediating entity would only provide one isolated account's data without the ability to create super-user accounts. Thus, this limited breach would maintain the security of the information servers' content by eliminating malicious use of administrative privileges. Further, the mediating entity would be extremely difficult to hack because all commands are only known by trusted developers.

Yet another benefit of the present invention is interoperability. Many systems disclose Application Programming Interface (API) information in order to increase interoperability. Publicly disclosing API information enables malicious attackers to circumvent security measures. The present invention overcomes the aforementioned disadvantage by using standard web service components to interface with devices while securing data with proprietary protocols.

The primary goal of this system and method is to provide for the means to deploy web applications while keeping data secure. Current web server and application server security is supplemented by security protocols (e.g., Secure Shell Protocol (SSH), Secure Socket Layer (SSL), Transport Layer Security (TLS), etc.) within the mediating entity. Security is further strengthened by adding a second level of authentication via proprietary security protocols and limiting the knowledge of the mediating entity's security protocols.

The secondary goal of this system and method is to enhance mobile web application adoptability by emphasizing the importance of data security. Skeptical consumers can confidently use mobile web applications knowing their valuable data is stored on highly secured information servers that are not vulnerable to typical security concerns.

The tertiary goal of this system and method is to reduce the cost of hosting. High security server space is very expensive. The present invention only requires high security server space for the mediating entity and information servers. The web and application servers can be hosted on standard security server space.

The quaternary goal of this invention is to reduce latency. Many proposed solutions encrypt the entire information server. Each data request requires that the data be decoded and/or encoded, thus increasing processing time. The present invention removes the requirement for total encryption of the information server without sacrificing security.

BRIEF DESCRIPTION OF THE SEVERAL VIEWS OF THE DRAWINGS

The present disclosure will be better understood by reading the Detailed Description of the Preferred and Selected Alternate Embodiments with reference to the accompanying drawing figures, which are not necessarily drawn to scale, and in which like reference numerals denote similar structure and refer to like elements throughout, and in which.

Figure 1:
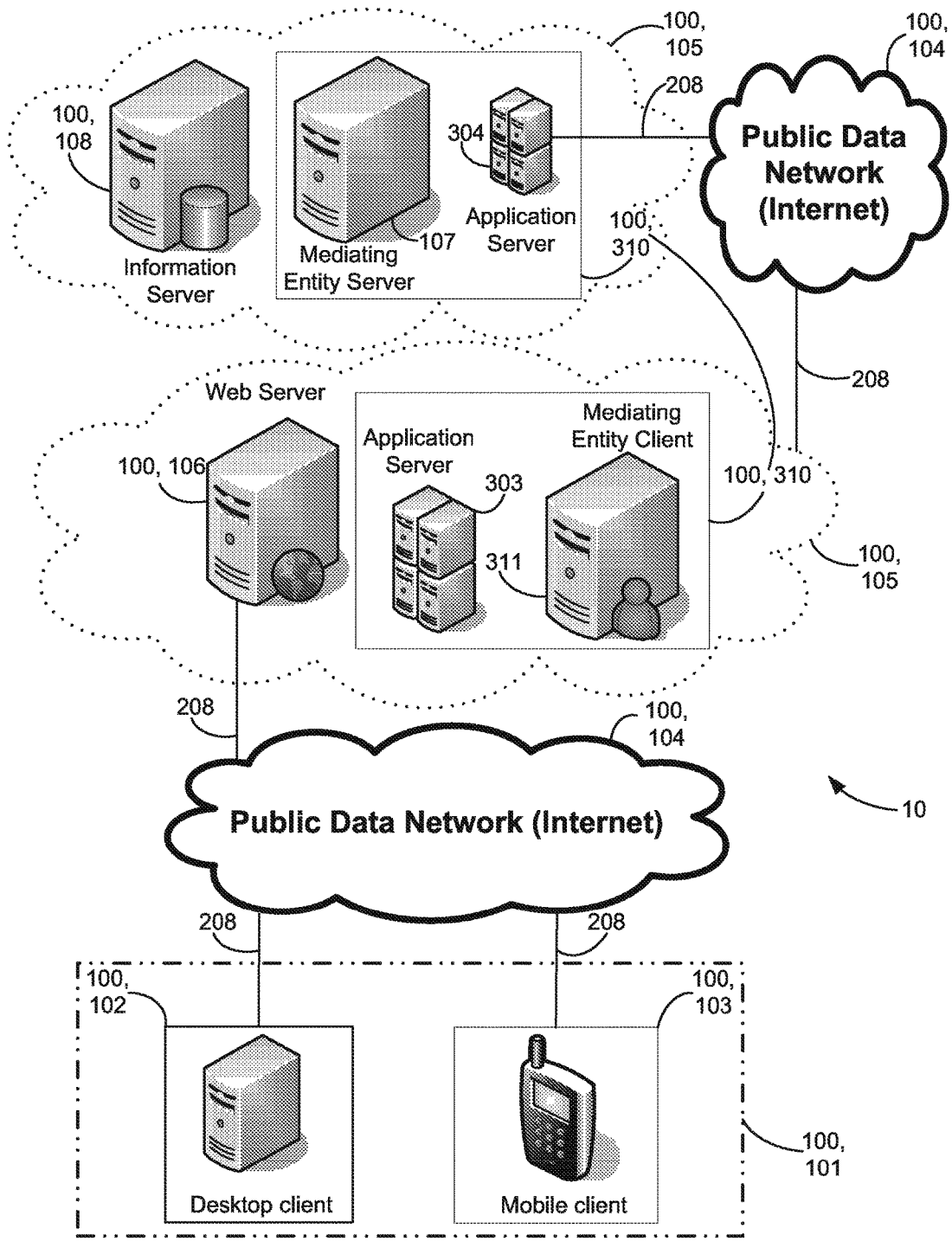
FIG. 1 is a schematic overview according to a preferred embodiment of a secure network depicting use of at least one Mediating Entity.
Figure 2:
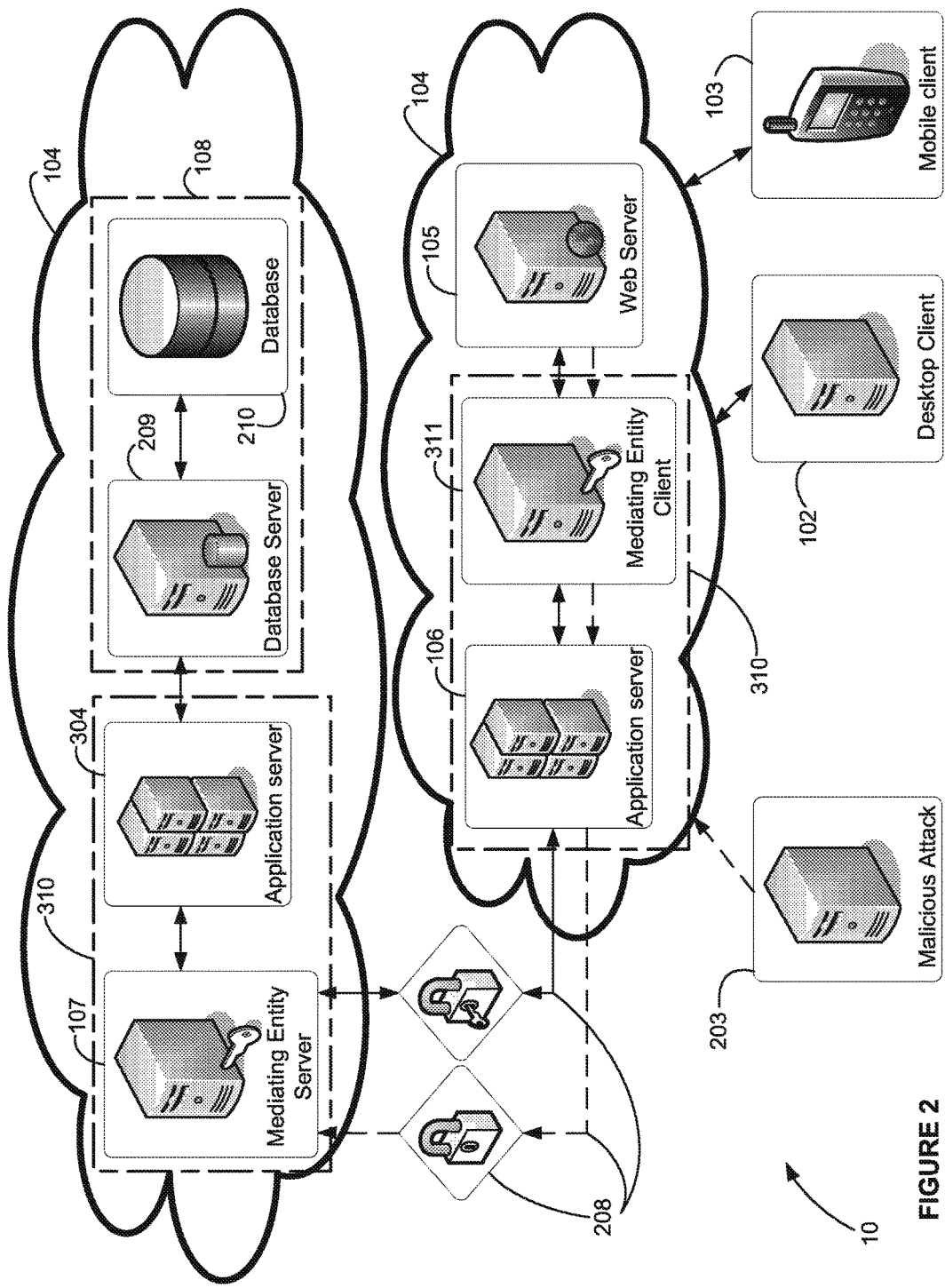
FIG. 2 is a block diagram depicting a preferred embodiment of a secure network with attempt of intrusion.
Figure 3:
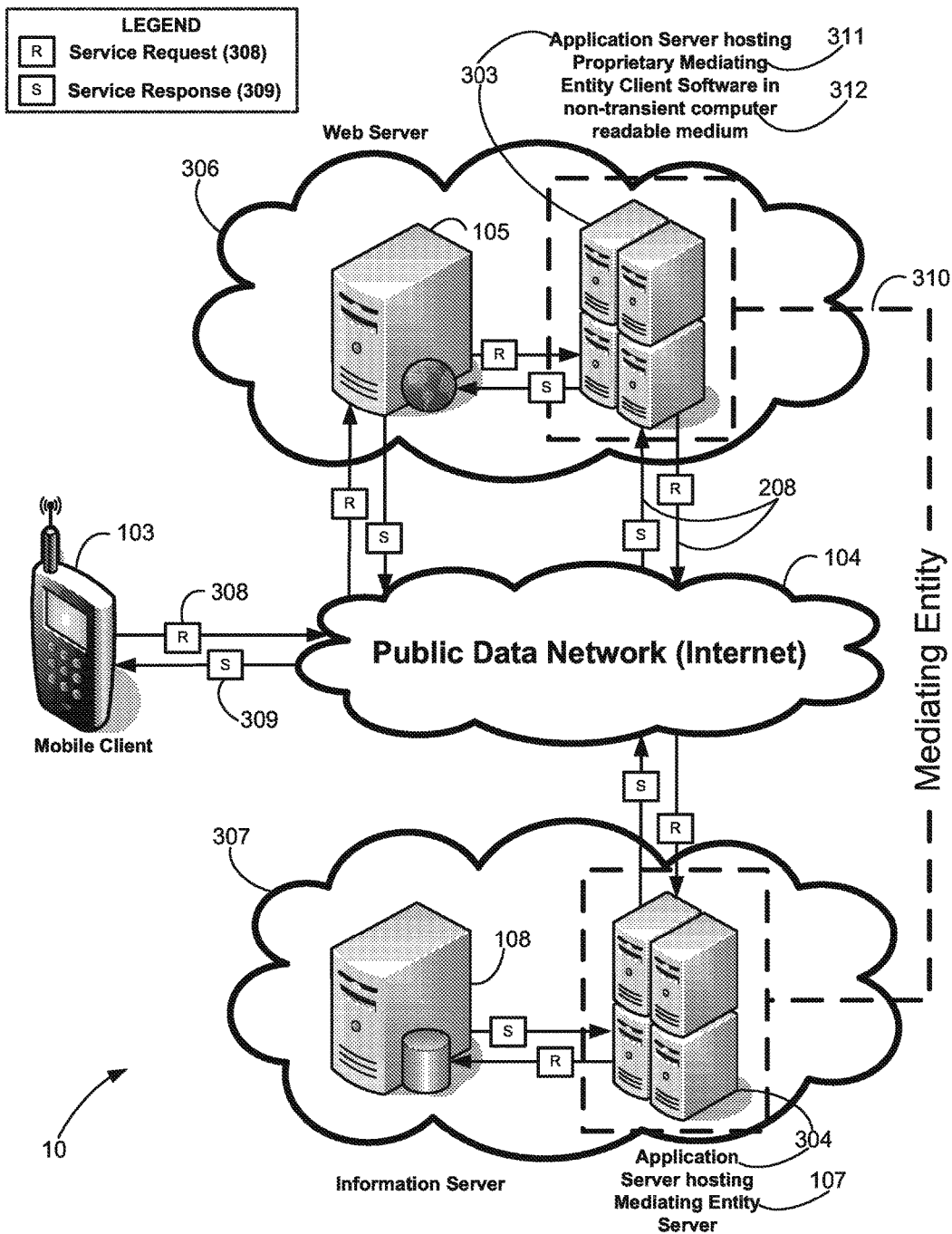
FIG. 3 illustrates high-level use of a Mediating Entity in the solicitation of service request process.

It is to be noted that the drawings presented are intended solely for the purpose of illustration and that they are, therefore, neither desired nor intended to limit the disclosure to any or all of the exact details of the construction shown, except insofar as they may be deemed essential to the claimed disclosure.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-6E, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-6E, by way of example, and not limitation, there is illustrated an example embodiment of system 10 for securely accessing data through web applications, wherein system 10 comprises computer apparatus 100, mediating entity 310, solicitation for service request 308, and response to solicitation for service request 309. Computer apparatus 100 comprises distributed computing environment 104, servers 105, service requestor device 101, and secure communication links through the public data network (Internet) 208, wherein servers 105 comprise web server 106, application server(s) 303 and 304, mediating entity server 107 and information server 108 (best shown in FIGS. 1-2). Mediating entity 310 comprises application server 303 hosting proprietary mediating entity client 311 stored in non-transient computer-readable medium 312, and a second application server 304 hosting mediating entity server 107 (best shown in FIGS. 1 and 3). Information server 108 comprises database server 209 and database 210 (best shown in FIG. 2), wherein database 210 comprises data that is extracted or stored 511, the execution of which represents a response to (a.k.a. a satisfaction thereof) to a solicitation for service request 309 provided to the service requestor device 101 (best shown in FIGS. 1 and 3).

It will be recognized by those skilled in the art that distributed computing environment 104 may be a LAN, WAN, VPN, cloud, combination thereof or any network configuration of electronic devices. It will further be recognized that web server 106 and application server 106, may function on separate computers (best shown in FIGS. 1-2), or alternatively may function on the same computer (not shown). Similarly, it will further be recognized that mediating entity server 107, database server 209 and database 210 may function on separate computers (best shown in FIG. 2), or alternatively may function on the same computer (collectively labeled 'information server') (best shown in FIGS. 1 and 3). It will further be recognized that application server 303 may comprise a single computer that comprises both application server 303 and mediating entity client software 311 stored in non-transient computer readable medium 312 (best shown in FIG. 3), or alternatively may function on separate computers (best shown in FIG. 1).

Turning now to FIGS. 6A-6D, in use, service requestor begins session 600 at step 601, wherein service requestor uses a service requestor device 102 (for non-limiting example purposes only) to solicit and process a service request—102 is an exemplary device in a category of devices that are capable of processing the request at this point, instead of merely forwarding it on for later processing.

Via step 602, which takes place within a secured network space 609 (e.g. a cloud, for non-limiting example purposes only), the request is transmitted via the web browser to the web server. At step 603, the web server applies standard Internet authentication (if configured). If the service requestor has been authenticated at step 604, then session proceeds to step 605; if not, session 600 proceeds back to step 601. At step 605, the authenticated request is transmitted to the web server. Once at step 605, the request is then sent to the application server at step 606. At step 607, the request is forwarded from the application server to the mediating entity proprietary client for authentication. At step 608, the service requestor provides credentials, at which point the mediating entity proprietary client contacts the mediating entity server at step 611 and forwards the provided credentials to the mediating entity server at step 612.

Subsequently at step 613, which takes place in a separate secured network space 610 (e.g. a second cloud, for non-limiting example purposes only), the mediating entity server then applies business organization-selected proprietary security protocols comprised of at least one of a plurality of industry recognized authentication protocols (e.g. user names and corresponding alphanumeric passwords, biometric readers, certificates, graphical authentications, smart cards, and/or extensions thereof, for non-limiting example purposes only) to authenticate the requestor. If the service requestor's credentials are successfully authenticated at step 614, then session proceeds to step 615; if not, session 600 proceeds back to step 601.

At step 615, the mediating entity server forwards the service request to the information server. The information server then extracts or stores the data associated with the request from the information server in step 616. At this point, the service request has been satisfied and confirmation of this satisfaction (i.e. data extraction or storage from the information server) is returned to the requestor via the same steps traveled to satisfy the request in session 600 (confirmation path best shown in FIG. 6B).

Figure 6A:
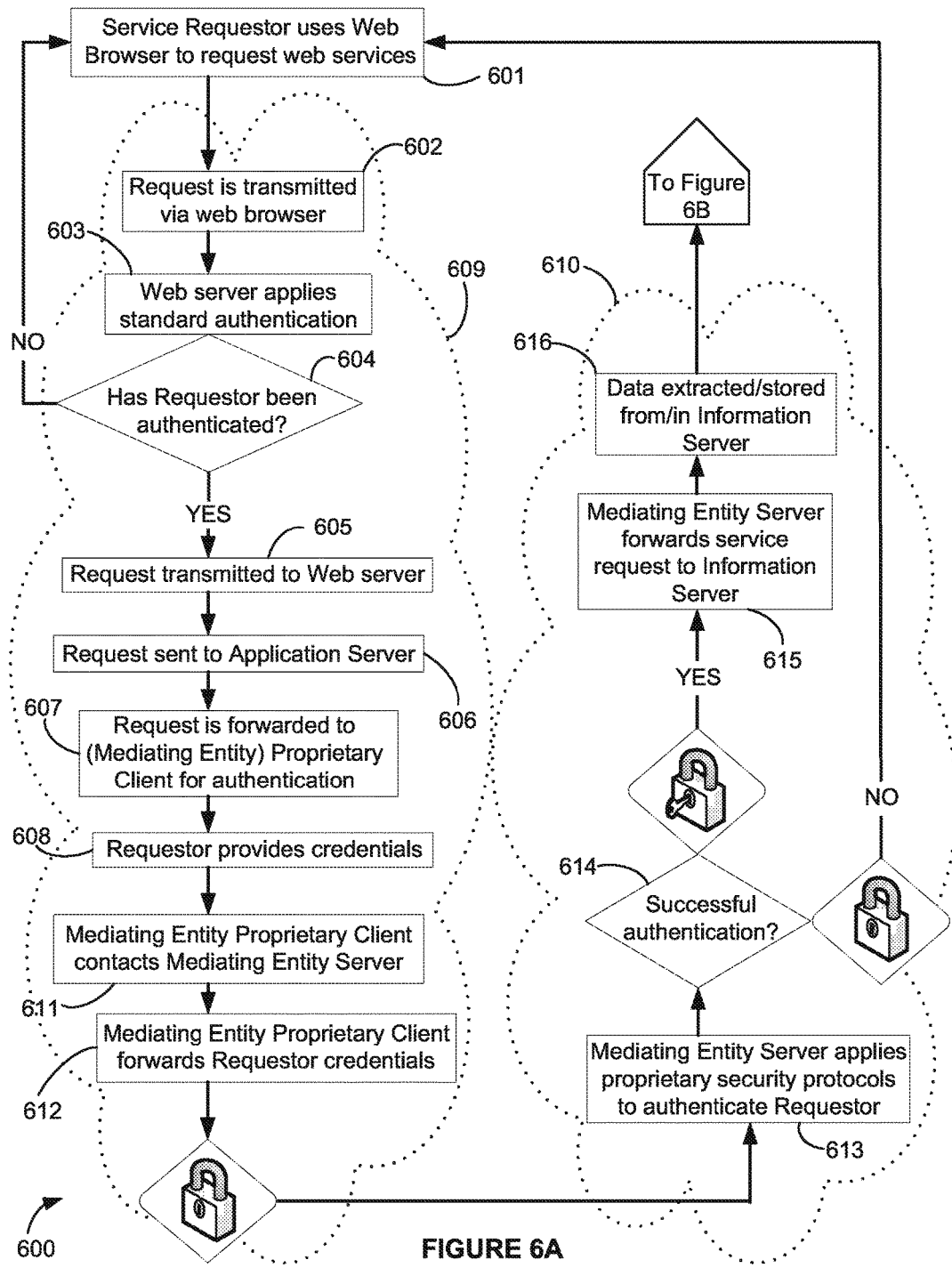
FIG. 6A is a flowchart illustration depicting one embodiment of the solicitation of service requests with a Mediating Entity, highlighting the secure, multi-point process, according to the high-level embodiment of FIG. 3.
Figure 6B:
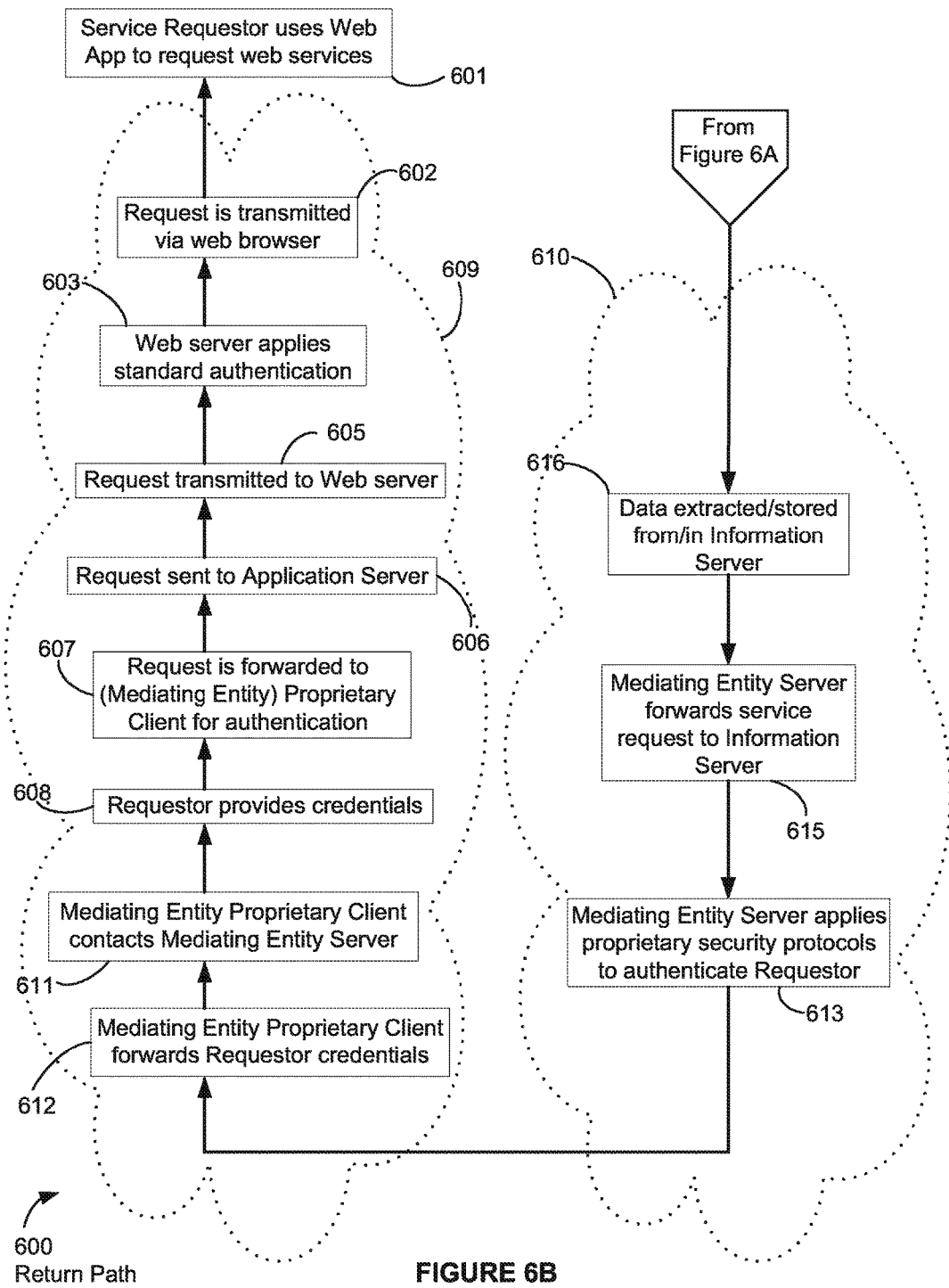
FIG. 6B is the return-path of FIG. 6A's flowchart illustration depicting one embodiment of the solicitation of service requests with a Mediating Entity, highlighting the secure, multi-point process, according to the high-level embodiment of FIG. 3.
Figure 6C:
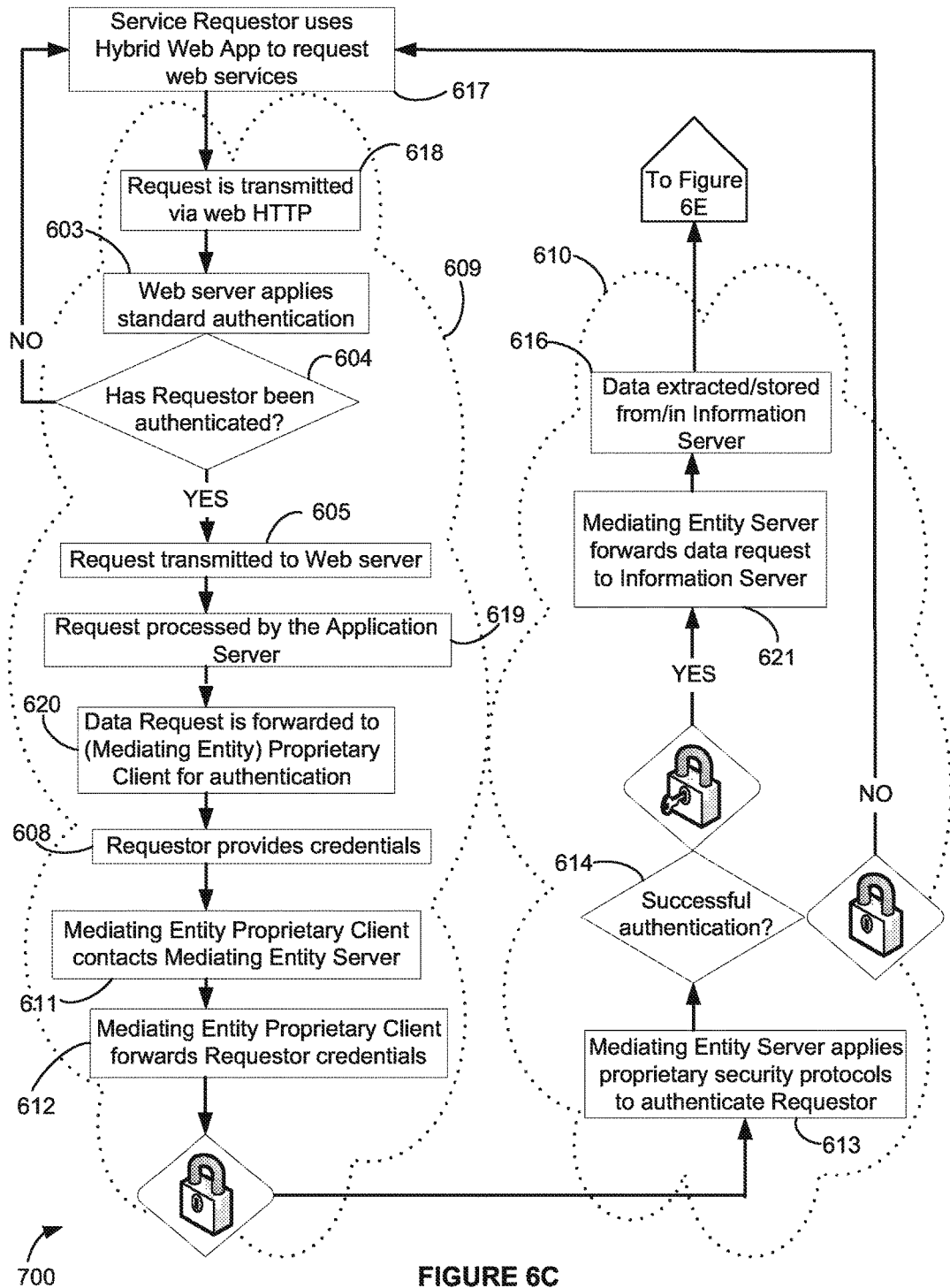
FIG. 6C is a flowchart illustration depicting another embodiment of the solicitation of service requests with a Mediating Entity, highlighting the secure, multi-point process as well as at least one of the various locations the service requests could actually be processed, according to the high-level embodiment of FIG. 3.

Turning now particularly to FIG. 6C, in an alternate embodiment, session 700 shares many similarities with session 600 with some important differences. In use, service requestor begins session 700 at step 617, wherein service requestor uses a service requestor device 103 (for non-limiting example purposes only) to solicit a service request—103 is an exemplary device in a category of devices that are incapable of processing the request at this point, they can only forward it.

Via step 618, which takes place within a secured network space 609 (e.g. a cloud, for non-limiting example purposes only), the request is transmitted via HTTP to the web server. At step 603, the web server applies standard Internet authentication (if configured). If the service requestor has been authenticated at step 604, then session proceeds to step 605; if not, session 700 proceeds back to step 617. The authenticated request is transmitted to the web server at step 605. Once at step 605, the request is then sent to the application server for processing at step 619. At step 620, the processed data request is forwarded to the mediating entity proprietary client for authentication. At step 608, the service requestor provides credentials, at which point the mediating entity proprietary client contacts the mediating entity server at step 611 and forwards the provided credentials to the mediating entity server at step 612.

Subsequently at step 613, which takes place in a separate secured network space 610 (e.g. a second cloud, for non-limiting example purposes only), the mediating entity server then applies business organization-selected proprietary security protocols comprised of at least one of a plurality of industry recognized authentication protocols (e.g. user names and corresponding alphanumeric passwords, biometric readers, certificates, graphical authentications, smart cards, and/or extensions thereof, for non-limiting example purposes only) to authenticate the requestor. If the service requestor's credentials are successfully authenticated at step 614, then session proceeds to step 621; if not, session 700 proceeds back to step 617.

At step 621, the mediating entity server forwards the data request to the information server. The information server then extracts or stores the data associated with the request from the information server in step 616. At this point, the data request has been satisfied and confirmation of this satisfaction (i.e. data extraction or storage) is returned to the requestor via the same steps traveled to satisfy the request in session 700 (confirmation path best shown in FIG. 6E).

Figure 6D:
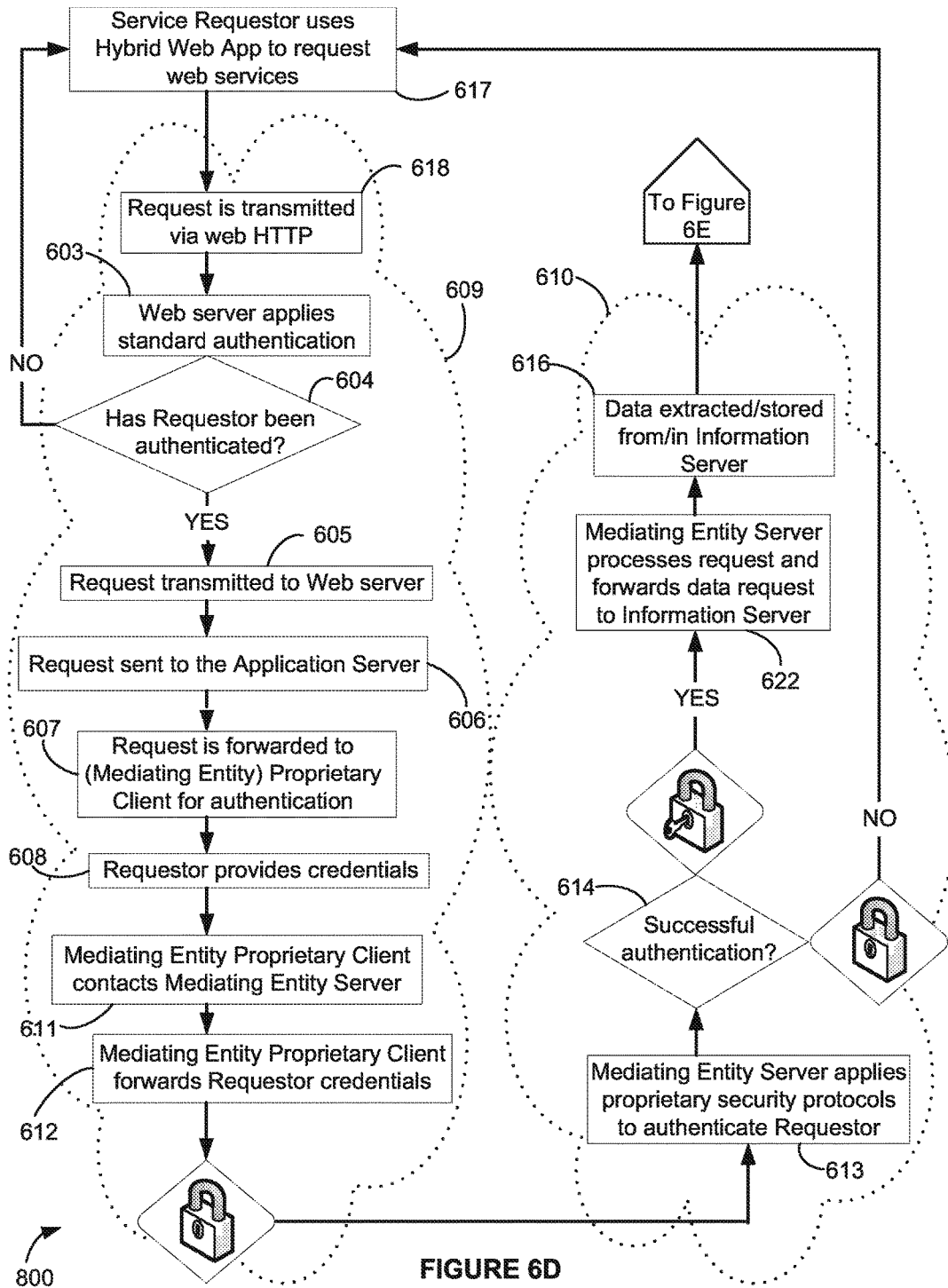
FIG. 6D is a flowchart illustration depicting another embodiment of the solicitation of service requests with a Mediating Entity, highlighting the secure, multi-point process as well another of the at least one of the various locations the service requests could actually be processed, according to the high-level embodiment of FIG. 3.
Figure 6E:
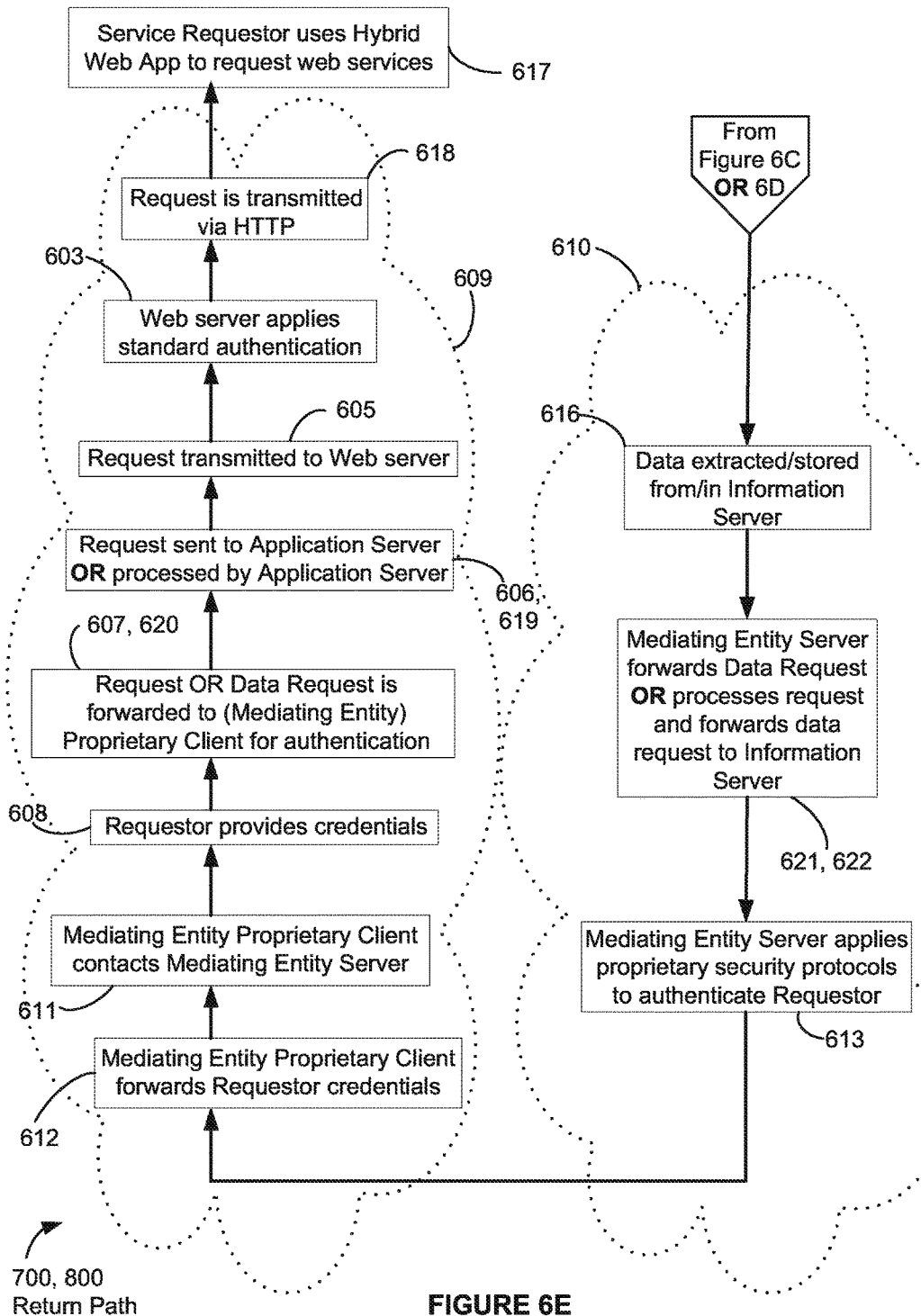
FIG. 6E is the return-path of FIGS. 6C and 6D's flowchart illustration depicting another embodiment of the solicitation of service requests with a Mediating Entity, highlighting the secure, multi-point process as well as several of the at least one various locations the service requests could actually be processed, according to the high-level embodiment of FIG. 3.

Turning now more particularly to FIG. 6D, in an alternate embodiment, session 800 shares many similarities with sessions 600 and 700 with some important differences. In use, service requestor begins session 800, at step 617, wherein service requestor uses a service requestor device 103 (for non-limiting example purposes only) to solicit a service request—103 is an exemplary device in a category of devices that are incapable of processing the request at this point, they can only forward it.

Via step 618, which takes place within a secured network space 609 (e.g. a cloud, for non-limiting example purposes only), the request is transmitted via HTTP to the web server. At step 603, the web server applies standard Internet authentication (if configured). If the service requestor has been authenticated at step 604, then session proceeds to step 605; if not, session 800 proceeds back to step 617. The authenticated request is transmitted to the web server at step 605.

Once at step 605, the request is then sent to the application server at step 606. At step 607, the request is forwarded from the application server to the mediating entity proprietary client for authentication. At step 608, the service requestor provides credentials, at which point the mediating entity proprietary client contacts the mediating entity server at step 611 and forwards the provided credentials to the mediating entity server at step 612.

Subsequently at step 613, which takes place in a separate secured network space 610 (e.g. a second cloud, for non-limiting example purposes only), the mediating entity server then applies business organization-selected proprietary security protocols comprised of at least one of a plurality of industry recognized authentication protocols (e.g. user names and corresponding alphanumeric passwords, biometric readers, certificates, graphical authentications, smart cards, and/or extensions thereof, for non-limiting example purposes only) to authenticate the requestor. If the service requestor's credentials are successfully authenticated at step 614, then session proceeds to step 622; if not, session 800 proceeds back to step 617.

At step 622, the mediating entity server processes and then forwards the data request to the information server. The information server then extracts or stores the data associated with the request from the information server in step 616. At this point, the service request has been satisfied and confirmation of this satisfaction (i.e. data extraction or storage from the information server) is returned to the requestor via the same steps traveled to satisfy the request in session 800 (confirmation path best shown in FIG. 6E).

Figure 4A:
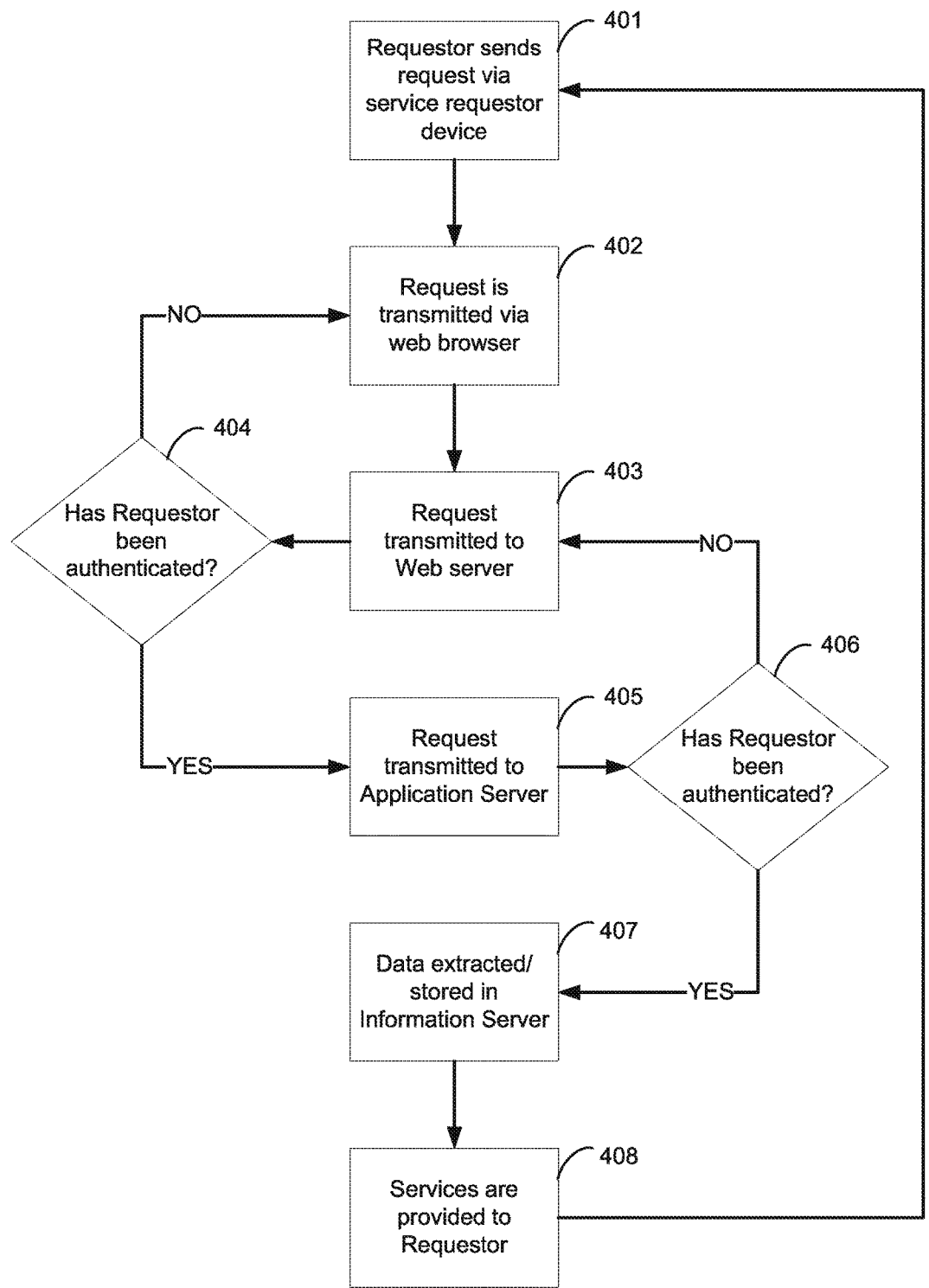
FIG. 4A is a flowchart depicting the solicitation of service requests with standard Internet security.
Figure 4B:
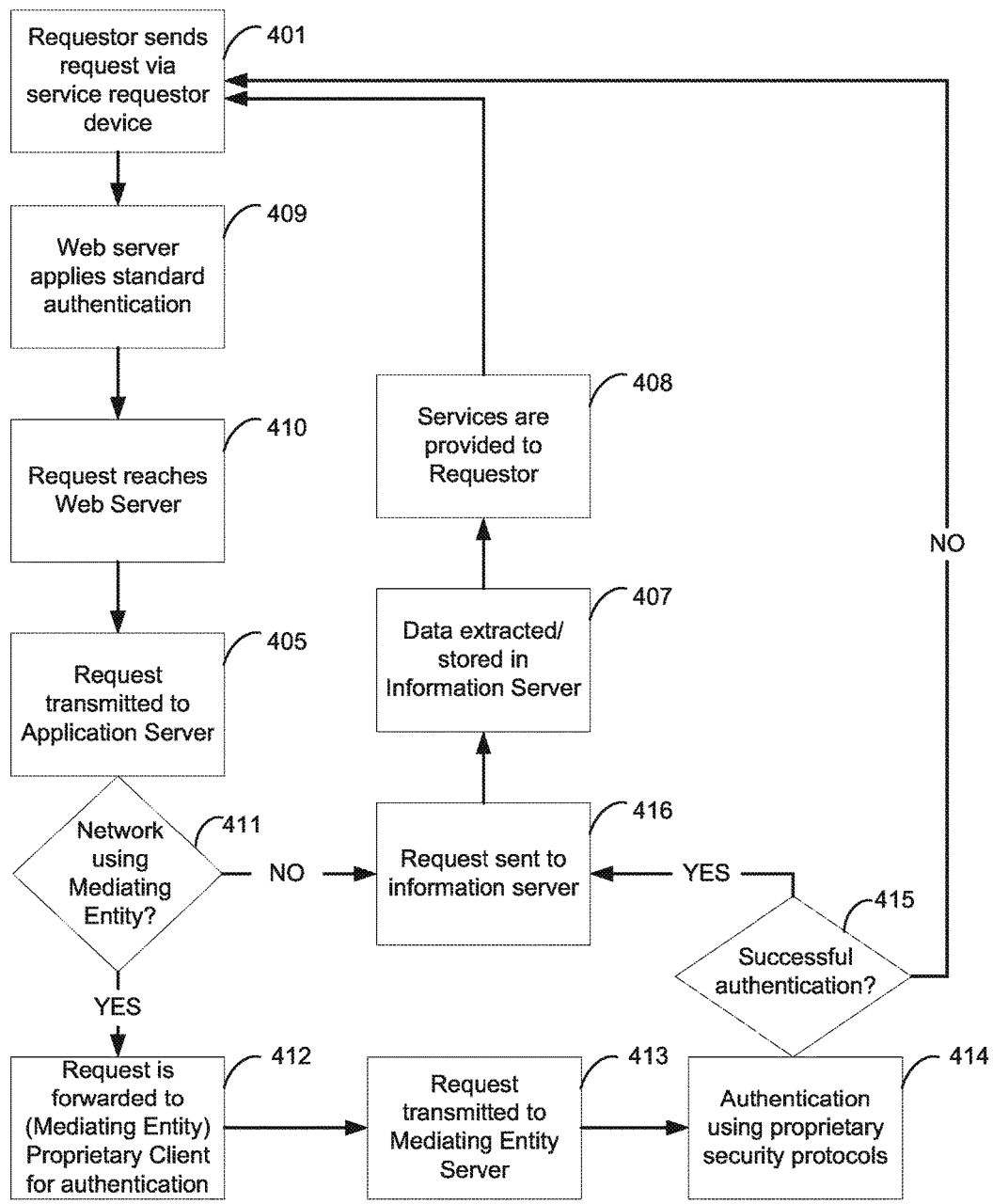
FIG. 4B is a flowchart depicting the solicitation of service requests with a Mediating Entity included in addition to standard Internet security.

Turning now to FIGS. 4A and 4B, system 10 is different from traditional web services models in several significant ways. FIG. 4A generically depicts a traditional web services model (some steps may differ). At step 401 the service requestor sends the solicitation for service request via a service requestor device 101. The request is then transmitted via web browser at step 402 to the web server at step 403. Traditional web services models would apply standard Internet authentication here (if configured), via step 404. If the requestor is authenticated, the request is then transmitted to the application server at step 405; if not, the requestor is sent back to step 402 to try again. Once at step 405, the request is then further authenticated by the application server at step 406. If the requestor is authenticated by the application server, the request is then satisfied by data stored or extracted from the information server at step 407; if not, the requestor is sent back to step 405 to try again. At step 408, confirmation of satisfaction is sent to requestor (i.e. data extraction to or storage from the information server).

Turning now particularly to FIG. 4B, system 10's critical differences are highlighted in comparison to FIG. 4A's traditional web services model. At step 401 the service requestor sends the solicitation for service request via a service requestor device 101. The request then receives standard Internet authentication (if configured) at step 409, and if authenticated, the request reaches the web server via step 410. From step 410, the request is then sent to the application server at step 405. Here, the network mediating entity of the present disclosure is injected, adding an additional layer of secure authentication beyond standard Internet authentication. Step 411 determines if a network mediating entity is being used, and if so, forwards the request to the mediating entity proprietary client for authentication at step 412; if not, the request is sent directly to the information server at step 416. Referencing the process from FIG. 4A, the information server at step 416 then satisfies the request by data stored to or extracted from the information server at step 407. At step 408, confirmation of satisfaction is sent back to requestor at step 401.

However, if step 411 determines that a network mediating entity is being used and forwards the request to the mediating entity proprietary client for authentication at step 412, the request is then sent to the mediating entity server at step 413. The mediating entity server then applies business organization-selected proprietary security protocols comprised of at least one of a plurality of industry recognized authentication protocols (e.g. user names and corresponding alphanumeric passwords, biometric readers, certificates, graphical authentications, smart cards, and/or extensions thereof, for non-limiting example purposes only) to authenticate the requestor. If the service requestor's credentials are successfully authenticated at step 415, the request is then sent to the information server at step 416; if not, the request is sent back to step 401 to try again. Once at step 416 the information server satisfies the request by storing in or extracting data from the information server at step 407. At step 408, confirmation of satisfaction is sent back to requestor at step 401.

Figure 5:
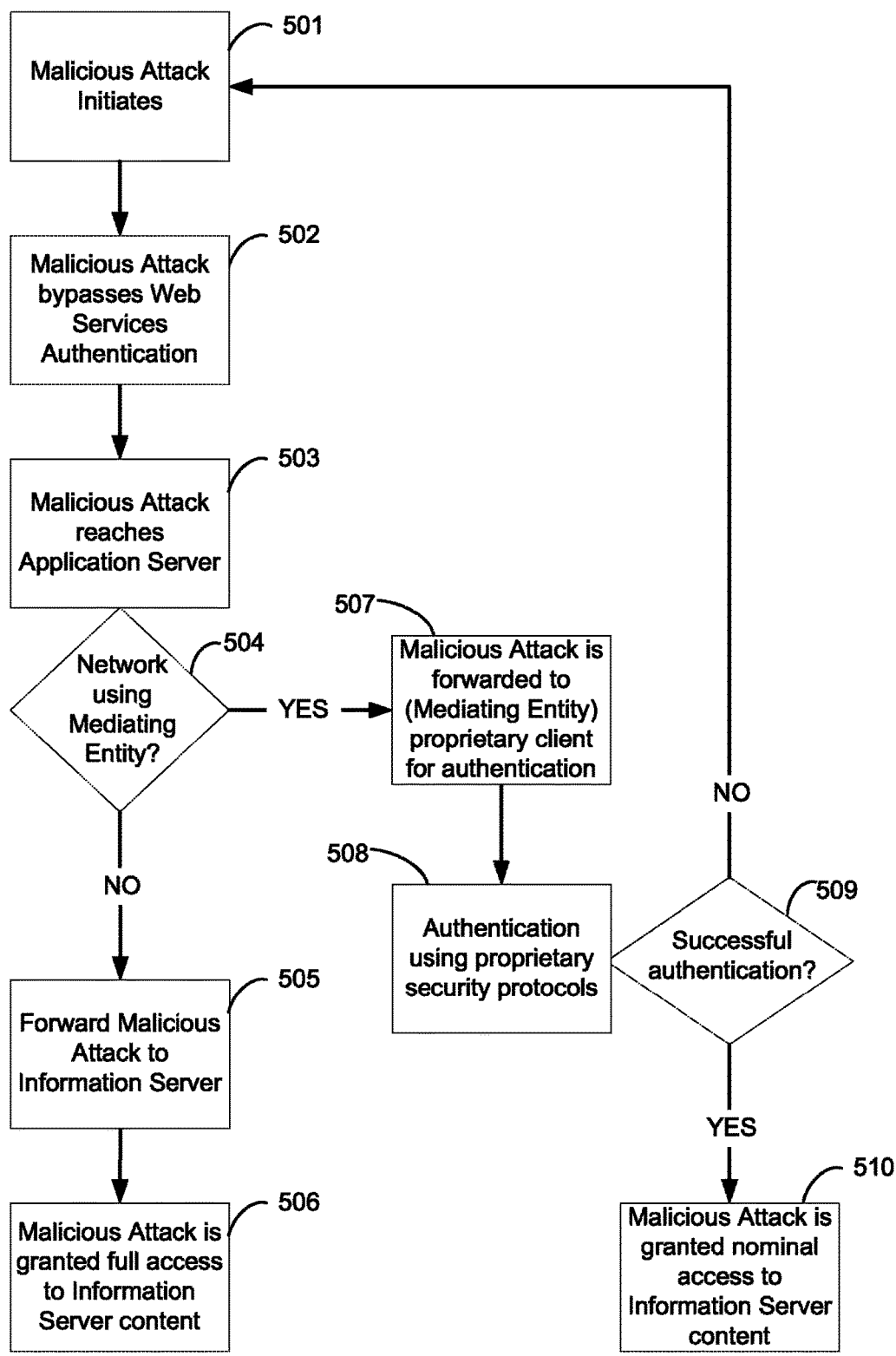
FIG. 5 is a flowchart depicting an attempt of intrusion, and how an attempt could bypass standard Internet security but get caught by a Mediating Entity.

Turning now to FIG. 5, the importance of the difference between traditional web services models and the present disclosure is highlighted by example, showing generally the result of a malicious attack on each of the models.

A malicious attack is initiated at step 501. A malicious attack, by its nature is typically designed to be capable of bypassing standard Internet security at step 502 and thus reaches the application server directly at step 503. Here, if a network mediating entity is not being used, via step 504, the malicious attack is forwarded directly on to the information server at step 505. Once at the information server, the malicious attack is granted full, or unrestricted access to the information server's content at step 506.

However, if a network mediating entity is being used, via step 504, the malicious attack is forwarded to the mediating entity proprietary client for authentication at step 507. At step 508, the mediating entity server then applies business organization-selected proprietary security protocols comprised of at least one of a plurality of industry recognized authentication protocols (e.g. user names and corresponding alphanumeric passwords, biometric readers, certificates, graphical authentications, smart cards, and/or extensions thereof, for non-limiting example purposes only) to authenticate the requestor. If authentication is successful, even if malicious, at step 509, the malicious attack is granted only nominal, restricted access to the information server content at step 510; if not, the requestor is sent back to step 501 to try again.

It will be recognized by those skilled in the art that it is nearly impossible to prevent all malicious attacks via learned requestor credentials. It will further be recognized that using a strengthened authentication process such as the present disclosure effectively minimizes the number of successful malicious attacks and the quantity and type of data that can be accessed thereof in ways the current art do not suggest.

The foregoing description and drawings comprise an illustrative embodiment of the present disclosure. Having thus described exemplary embodiments of the present disclosure, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herewith, but is limited only by the following claims.

What is claimed is:

1. A system to provide information server security, said system comprising:
    a computer apparatus configured to transmit a solicitation of requests for service by a requestor via a public data network;
    a server network infrastructure having:
        a web server on a first secured network space, said web server configured to receive said solicitation of request for service and transmit said solicitation of request for service;
        an application server configured to receive said solicitation of request for service from said web server and transmit said solicitation of requests for service;
        a mediating entity client located on said first secured network space, said mediating entity client configured to receive said solicitation of request for service from said web server, authenticates said solicitation of request for service into a secure solicitation of request for service via an exchange of one or more credentials from a requestor, and transmit said secure solicitation of request for service, and
        a mediating entity server located on a second secured network space, said mediating entity server configured to receive said secure solicitation of request for service from said mediating entity client, said mediating entity server configured to authenticate said secure solicitation of request for service using a security protocol, wherein said security protocol further comprises an industry security protocol selected by a business organization without publicly disclosing the selected said industry security protocol and known only to privileged administrators and transmit an authenticated, secure solicitation of request for service; and
    an information server located on said second secured network space, on a separate device from said mediating entity server on said second secured network space, said information server configured to receive said authenticated secure solicitation of request for service from said mediating entity server, said information server configured to extract data responsive to said authenticated secure solicitation of request for service from said requestor,
    wherein said server network infrastructure utilizes said mediating entity client as a secure communication intercessor amid said computer apparatus and said information server, to enable a secure communication initiated by said solicitation for service request received by said web server via said public data network from said requestor.

2. The system of claim 1, wherein said mediating entity client is implemented in a non-transitory computer readable medium on said application server.

3. The system of claim 2, wherein said security protocol comprise at least one of a plurality of industry authentication protocols.

4. The system of claim 1, wherein said web server authenticates said requestor before transmitting said solicitation of requests for service.

5. The system of claim 1 wherein said web server and said application server function on the same computer apparatus.

6. The system of claim 1, wherein said solicitation of request for service originates from said computer apparatus.

7. The system of claim 6, wherein said computer apparatus is a mobile device.

8. A method of providing information server security, said method comprising the steps of:
providing a secure network infrastructure having:
a web server on a first secured network space, said web server configured to receive a service request and transmit said service request;
an application server configured to receive said service request from said web server and transmit said service request;
a mediating entity client located on said first secured network space, said mediating entity client configured to receive said service request from said web server and transmit said service request for service;
a mediating entity server located on a second secured network space, said mediating entity server configured to receive said service request from said mediating entity client, said mediating entity server configured with a security protocol; and
an information server located on said second secured network space, on a separate device from said mediating entity server on said second secured network space;
soliciting said service request from a computer apparatus to an information server via a public data network;
receiving said service request from said web server at said mediating entity client, wherein said mediating entity client authenticates said service request into a secure service request via an exchange of one or more credentials from a requestor and transmits said secure service request to said mediating entity server;
authenticating said secure service request via said security protocol, wherein said security protocol further comprises an industry security protocol selected by a business organization without publicly disclosing the selected said industry security protocol and known only to privileged administrators by said mediating entity server;
transmitting said authenticated secure service request from said mediating entity server to said information server; and
obtaining data from said information server responsive to said authenticated secure service request.

9. The method of claim 8, wherein said security protocol further comprises utilizing at least one of a plurality of business security protocols to further perform the step of: providing a means of authentication for a requestor, wherein said plurality of business protocols comprise at least one of a plurality of industry authentication protocols.

10. The method of claim 9, wherein said mediating entity further performs the step of:
providing a layer of security for said information server against malicious attacks;
implementing said plurality of business security protocols;
authenticating said requestor, wherein said authentication adheres to said business security protocols and utilizes at least one of a plurality of credentials provided by said requestor.

11. The method of claim 10, wherein said information server further performs the steps of:
integrating a requestor's data into a computer readable medium; and
transmitting said requestor's data to said mediating entity server.

* * * * *